United States Patent
Lee et al.

(10) Patent No.: US 9,712,431 B2
(45) Date of Patent: Jul. 18, 2017

(54) METHODS FOR MANAGING TRANSACTION IN SOFTWARE DEFINED NETWORK

(71) Applicant: KT Corporation, Seongnam-si (KR)

(72) Inventors: Se Hui Lee, Daejeon (KR); Jeong Wook Lee, Daejeon (KR); Tae Jin Ahn, Daejeon (KR); Kyung Ah Han, Daejeon (KR)

(73) Assignee: KT Corporation, Seongnam-si (KR)

( * ) Notice: Subject to any disclaimer, the term of this patent is extended or adjusted under 35 U.S.C. 154(b) by 108 days.

(21) Appl. No.: 14/334,127

(22) Filed: Jul. 17, 2014

(65) Prior Publication Data

US 2015/0023147 A1    Jan. 22, 2015

(30) Foreign Application Priority Data

Jul. 17, 2013  (KR) .................. 10-2013-0084098
Dec. 24, 2013 (KR) .................. 10-2013-0162372

(51) Int. Cl.
| | | |
|---|---|---|
| *H04L 12/721* | (2013.01) | |
| *H04L 12/703* | (2013.01) | |
| *H04L 12/707* | (2013.01) | |
| *H04L 12/931* | (2013.01) | |
| *H04L 12/24* | (2006.01) | |
| *H04L 12/26* | (2006.01) | |

(52) U.S. Cl.
CPC .......... *H04L 45/38* (2013.01); *H04L 41/0873* (2013.01); *H04L 41/0893* (2013.01); *H04L 45/24* (2013.01); *H04L 45/28* (2013.01); *H04L 49/70* (2013.01); *H04L 41/0695* (2013.01); *H04L 43/10* (2013.01)

(58) Field of Classification Search
None
See application file for complete search history.

(56) References Cited

U.S. PATENT DOCUMENTS

2011/0286324 A1* 11/2011 Bellagamba ........ H04L 41/0677
                                                              370/219
2011/0307628 A1   12/2011  Chiba
(Continued)

FOREIGN PATENT DOCUMENTS

JP  WO 2013180207 A1 * 12/2013 ......... H04L 47/2483
JP     EP 2819356 A4 *  9/2015 ............. H04L 45/38

OTHER PUBLICATIONS

"OpenFlow Switch Specification", Open Networking Foundation, Version 1.4.0 (Wire Protocol 0x05), Oct. 14, 2013.*
(Continued)

*Primary Examiner* — Chi H Pham
*Assistant Examiner* — Vladislav Agureyev
(74) *Attorney, Agent, or Firm* — Sughrue Mion, PLLC (57) ABSTRACT

Disclosed are methods for managing transactions in a software defined network (SDN). A method performed in a controller may comprise generating a group message for modifying flow entries of a plurality of flow tables related to each other in a switch; and transmitting the group message to the switch. Thus, a plurality of flow tables having relevance to each other can be simultaneously modified so that modifications on a plurality of switches can be synchronized, and consistency of them can be guaranteed.

16 Claims, 7 Drawing Sheets

(56) References Cited

U.S. PATENT DOCUMENTS

| | | | | |
|---|---|---|---|---|
| 2013/0010600 A1* | 1/2013 | Jocha | .................... | H04L 43/026 |
| | | | | 370/236.2 |
| 2013/0046882 A1 | 2/2013 | Takashima et al. | | |
| 2013/0166703 A1* | 6/2013 | Hammer | ................ | H04L 41/50 |
| | | | | 709/220 |
| 2013/0170495 A1* | 7/2013 | Suzuki | ................ | H04L 49/3009 |
| | | | | 370/392 |
| 2014/0241356 A1* | 8/2014 | Zhang | .................... | H04L 45/38 |
| | | | | 370/392 |
| 2014/0280547 A1* | 9/2014 | DeCusatis | ............... | H04L 67/34 |
| | | | | 709/204 |
| 2014/0298052 A1* | 10/2014 | Meirosu | .............. | H04L 41/0833 |
| | | | | 713/320 |
| 2014/0372567 A1* | 12/2014 | Ganesh | .............. | H04L 67/1002 |
| | | | | 709/219 |
| 2015/0172174 A1* | 6/2015 | Kojima | ............... | H04L 47/2483 |
| | | | | 370/392 |

OTHER PUBLICATIONS

Ramona Trestian et al., "MiceTrap: Scalable Traffic Engineering of Datacenter Mice Flows using OpenFlow", 2013 IFIP/IEEE International Symposium on Integrated Network Management (IM2013): Short Paper, pp. 904-907.

"OpenFlow Switch Specification", Open Networking Foundation, Version 1.3.2 (Wire Protocol 0x04), Apr. 25, 2013, pp. 1-131.

* cited by examiner

| Field | Size (Byte) | Type | Description |
|---|---|---|---|
| OFP_HEADER | 8 | | Protocol common header |
| Type | 2 | unit16_t | group message type |
| Count | 4 | unit32_t | Number of command messages included in group message |
| Length | 2 | unit8_t | Length of group message |
| Groupid | 1 | unit8_t | Group message ID |
| Table_id | 1 | unit8_t | Flow table ID |
| command | 1 | unit8_t | Command(Add/Modify/Delete) |
| priority | 2 | unit16_t | Flow entry priority |
| out_port | 4 | unit32_t | Output port |
| OFP_MATCH | 8 | | Structure defined match field |
| err_code | 2 | unit16_t | Error code |

610: OFP_HEADER
620: Type, Count, Length
630: Groupid, Table_id, command, priority, out_port, OFP_MATCH

FIG. 8

METHODS FOR MANAGING TRANSACTION IN SOFTWARE DEFINED NETWORK

CLAIM FOR PRIORITY

This application claims priorities to Korean Patent Application No. 10-2013-0084098 filed on Jul. 17, 2013 and No. 10-2013-0162372 filed on Dec. 24, 2013 in the Korean Intellectual Property Office (KIPO), the entire contents of which are hereby incorporated by references.

BACKGROUND

1. Technical Field

Example embodiments of the present invention relate to a software-defined networking (SDN) technology, and more specifically to methods for managing transactions in a software defined network.

2. Related Art

The networks comprising conventional routers and switches are configured with complex protocols and functions. Since operation methods and user interfaces for them are different according to vendors of apparatuses, it is difficult for network operators and researchers on network technologies to develop new network protocols to be applied to networks, to expand the network, and to make the network apparatuses interwork with each other. In order to overcome the above-described problem, there have been studies on technologies of switches and routers having open-type interface. However, since the network technologies based on the open-type interfaces are expensive as compared with their performances, their commercialization was not achieved easily.

'OpenFlow' technology appeared in order to resolve the high cost problem, and provide users and developers with open-type standardized interfaces.

The OpenFlow technology separates a packet forwarding function and a control function of a network switch, and provides a standardized protocol for communicating between the two functions. Therefore, if the OpenFlow technology is used, packet paths may be determined by using software driven in an external control apparatus, and traffic may be controlled more precisely than the conventional technologies.

Open Networking Foundation (ONF) has defined a software defined networking (hereinafter, referred to as 'SDN') technology which can enable easier network programming possible based on OpenFlow.

A SDN structure based on OpenFlow comprises a plurality of OpenFlow switches and at least one controller. The OpenFlow switches and the controller may be connected to each other by using the OpenFlow protocol.

In the SDN network based on OpenFlow, a controller may provide flow table information to switches, and the switches may change properties of packets using the provided flow table information, or process the packets by controlling flows of the packets.

Meanwhile, in addition to the ONF, various standardization organizations such as an Internet Engineering Task Force (IETF), a European Telecommunication Standards Institute (ETSI), an International Telecommunications Union-Telecommunication (ITU-T), etc. have been progressing standardization on the SDN-based networks. For example, an Interface to the Routing System (I2RS) working group of IETF is progressing standardization for open-type interface structures located between an external client and an agent located in a router, which can make it possible that conventional router apparatuses can be monitored and controlled by the external controller.

As described above, although various standard organizations such as the ONF and the IETF have been progressing the standardization on the SDN technology, a detail method for guaranteeing consistency of transactions between a controller and at least one switch, or between a client and at least one agent has not been proposed yet.

SUMMARY

Accordingly, example embodiments of the present invention are provided to substantially obviate one or more problems due to limitations and disadvantages of the related art.

Example embodiments of the present invention provide methods for transactions in a SDN network, which can guarantee consistencies of transactions between a controller and at least one switch.

The objectives which the present invention pursues are not restricted to the above-described objective, and any other objectives which are not described in the present specification may be clearly understood to persons skilled in the art to which the present invention pertains.

In some example embodiments, a method for managing transactions in a SDN network, performed in a controller, may comprise generating a group message for modifying flow entries of a plurality of flow tables related to each other in a switch; and transmitting the group message to the switch.

Here, the group message includes a plurality of command messages for simultaneously modifying flow tables having relevance to each other among the plurality of flow tables in the switch.

Also, the plurality of command messages utilize common structure.

Also, the group message includes information on at least one of a type of the group message, a number of the plurality of command messages, a length of the group message, and an identifier of the group message.

Here, the method may further comprise receiving an acknowledgement (ACK) message indicating whether an error occurred in the group message from the switch; and transmitting a message indicating execution of the group message or cancellation of the group message based on the ACK message to the switch.

Also, the ACK message includes an error code corresponding to the error in the group message.

Also, the transmitting the message indicating execution of the group message or cancellation of the group message includes transmitting the message indicating cancellation of the group message to the switch if an error occurred in at least one of a plurality of messages included in the group message.

In other example embodiments, a method for managing transactions in a Software Defined Network (SDN), performed in a controller, may comprise generating a group message for modifying flow entries of a plurality of flow tables related to each other in a plurality of switches; and transmitting the group message to the plurality of switches.

Here, the group message includes a plurality of command messages for simultaneously modifying flow tables having relevance to each other among the plurality of flow tables in the plurality of switches.

Here, the method may further comprise receiving an acknowledgement (ACK) message indicating whether an error occurred in the group message from the plurality of switches; and transmitting a message indicating execution of the group message or cancellation of the group message based on the ACK message to the plurality of switches.

Also, the transmitting the message indicating execution of the group message or cancellation of the group message includes transmitting the message indicating cancellation of the group message to the plurality of switches if received a message indicating occurrence of an error in the group message from at least one of the plurality of switches.

In other example embodiments, a method for managing transactions in a SDN network, performed in a switch, may comprise receiving a group message for modifying flow entries of flow tables related to each other in the switch from a controller; verifying the group message; and transmitting an acknowledgement (ACK) message including information on occurrence of an error in the group message to the controller.

Here, the method may further comprise storing the group message received from the controller in a temporary storage region of the switch.

Here, the verifying the group message includes determining validation of the group message in regard to syntaxes of the group message and/or prerequisite conditions of the group message.

Here, the verifying the group message includes determining resource availability for executing the group message.

Here, the ACK message includes an error code corresponding to an error occurred in the group message, if any.

Here, the method may further comprise receiving a message instructing execution of the group message from the controller; and modifying the flow tables based on the group message stored in the temporary storage of the switch.

Here, the method may further comprise receiving a message instructing cancellation of the group message from the controller; and deleting the group message stored in the temporary storage region of the switch.

According to methods for managing transactions in the SDN network according to the present invention, a controller generates a group message in consideration of relevance of flow tables and operations which should be performed sequentially, and transmit the generated group message to a switch (or, a plurality of switches). The switch (or, the plurality of switches) verifies the received group message, and transmits the verification result to the controller. When the group message has no error, the controller instructs the switch (or, the plurality of switches) to execute the group message. On the contrary, when the group message has at least one error, the controller instructs the switch (or, the plurality of switches) to cancel execution of the group message.

Therefore, flow entries related to each other stored in the switch (or, the plurality of switches) can be modified simultaneously so that consistency between flow tables can be guaranteed.

Also, a plurality of flow tables having relevance to each other can be simultaneously modified so that modifications on a plurality of switches can be synchronized, and consistency of them can be guaranteed.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional detail disclosed herein are merely representative for purposes of describing example embodiments of the present invention, however, example embodiments of the present invention may be embodied in many alternate forms and should not be construed as limited to example embodiments of the present invention set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that when an element is referred to as being "on" or "below" another element, it can be directly on another element or intervening elements may be present.

It will be understood that, although the terms first, second, A, B, etc. may be used herein to describe various elements, these elements should not be limited by these terms. These terms are only used to distinguish one element from another. For example, a first element could be termed a second element, and similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a 'control apparatus' or a 'controller' in the specification means a functional entity controlling related components (for example, switches, routers, etc.) in order to control flows of traffic, and is not restricted to a specific physical implementation or a specific implementation position. For example, the controller may mean a controller functional entity defined in ONF, IETF, ETSI, or ITU-T. Also, a 'communication apparatus' or a 'switch' in the specification means a functional entity performing traffic (or, packet) forwarding, switching, or routing, and means a switch, a router, a switching element, a routing element, a forwarding element, etc. defined in ONF, IETF, ETSI, or ITU-T.

Also, the example embodiments of the present invention in the following description may be supported by standard specification documents written in ONF, IETF, ETSI, or ITU-T which are progressing standardization on SDN technologies. In other words, parts of the example embodiments which are not explained in the following description in order to clarify the technical spirit of the present invention may be supported by the standard documents written by the above-described standardization organizations. Also, all terminologies used in the present invention may be explained based on the above standard documents.

Hereinafter, embodiments of the present invention will be described in detail with reference to the appended drawings. In the following description, for easy understanding, like numbers refer to like elements throughout the description of the figures regardless of number of the figures.

Figure 1:
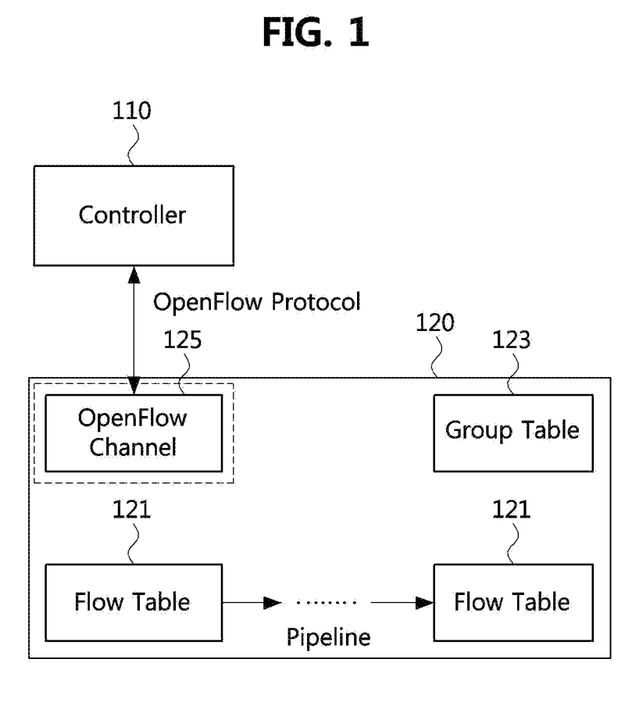
FIG. 1 is a block diagram illustrating a configuration of a SDN system.
Figure 2:
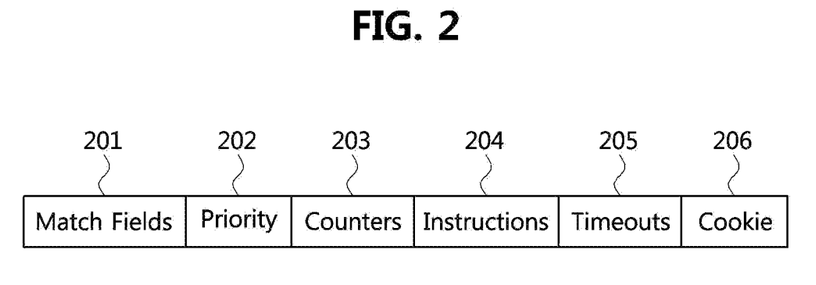
FIG. 2 illustrates a structure of flow entries included in a flow table.

FIG. 1 is a block diagram illustrating a configuration of a SDN system, and FIG. 2 illustrates a structure of flow entries included in a flow table.

Referring to FIG. 1, a SDN system may comprise a plurality of switches and at least one controller, and the plurality of switches and at least one controller may communicate with each other by using OpenFlow protocol. For convenience of explanation, a controller 110 and a switch 120 are illustrated in FIG. 1. However, multiple switches and multiple controllers may exist in the SDN system.

The switch 120 may comprise one or more flow tables 121, group tables 123 used for packet lookup and packet forwarding, and an OpenFlow channel 125 for communicating with the controller 110.

Each flow table 121 included in the switch is a set of flow entries. As illustrated in FIG. 2, each flow entry may be configured with a 'Match' field 201, a 'Priority' field 202, a 'Counters' field 203, an 'Instructions' field 204, a 'Timeouts' field 205, and a 'Cookies' field 206.

The 'Match' field 201 includes information for packet matching. The 'Match' field may include information about an ingress port and information about packet header. Optionally, the 'Match' field may include metadata indicated in a previous flow table. The 'Priority' field 202 may mean a matching priority of the flow entry. The 'Counters' field 203 may mean a value updated every time when a packet is matched. The 'Instructions' field 204 may be used for modifying action sets or pipeline processing. The 'Timeout' field 205 may mean a maximum time or idle time until expiration of a flow by the switch. The 'Cookie' field 206 is an opaque data value selected by the controller, and may be used for the controller to filter flow statistics, flow-modified, flow-removed, etc.

The matching for packet processing may be started from a first flow table among the plurality of flow tables 121 included in the switch 120, and continued in the following tables.

When the matched flow entry is found, the switch 120 may execute an instruction related to the specific matched flow entry. Otherwise, when the matched flow entry is not found in a flow table, the switch 120 may forward a packet to the controller 110 via the OpenFlow channel 125, or may drop the packet. Alternatively, the next flow table may continue matching process on the packet.

The instructions related to each flow entry may include instructions for action and instructions for modifying pipeline processes in the switch.

The action included in the instruction may describe packet forwarding, packet modification, and group table processing. For example, the action may instruct a packet to be delivered to a group specifying additional processing. Here, a group may represent a set of actions for processing flooding and more complex forwarding. Output actions common for packets related to a plurality of flow entries may be efficiently processed by using a group.

Instructions for pipe line processing may make packets delivered to the next flow table, and information in metadata form exchanged between flow tables. The pipe-line processing on the flow tables may be stopped when an instruction set related to matching flow entry does not specify the next flow table. At this time, packets are generally modified or forwarded.

Also, a flow entry may forward a packet to a port. Here, a port may mean a physical port or a logical port defined by the switch 120. Also, a port may mean a predefined reserved port. A reserved port may specify a comprehensive process such as transmitting a packet to the controller 110, flooding, or a packet forwarding using general methods except OpenFlow. Meanwhile, the logical ports defined by the switch 120 may specify a link aggregation group, tunnels, or a loopback interface.

A group table comprises a plurality of group entries. Each group entry may comprise an action bucket list having specific semantics related to type of the group. Here, an action bucket means a set of actions and related parameters. One or more actions included in an action bucket may deliver packets to a group.

The controller 110 may add, modify, or delete flow entries in the flow table 121 of each of the switches 120 by using OpenFlow protocol.

The OpenFlow protocol supports three message types such as a controller-to-switch type, an asynchronous type, and a symmetric type. Each message type includes a plurality of sub-type messages.

A controller-to-switch type message is a message generated by the controller 110, and used for managing the switch 120 directly or checking states of the switch 120. An asynchronous type message is a message generated by the switch 120, and used for updating information stored in the controller 110 according to network events and changes of states of the switch 120. A synchronous type message is a message generated by the switch 120 or the controller 110, and a message transmitted bi-directionally without an additional request.

A controller-to-switch type message includes a role-request message, a modify-state message, a barrier message, etc. The role-request message is a message used for the controller 110 to configure its role or query about its role, and used in a multi-controller environment. The modify-state message is a message transmitted from the controller 110 to the switch 20 in order to manage state of the switch 120, and used for adding, deleting, or modifying flow entry or group entry of the OpenFlow table 121, configuring properties of ports in the switch 120. A barrier message comprises a barrier request message and a barrier response message, and is used for maintaining dependency between messages transmitted from the controller 110 to the switch 120, and used for the switch 120 to report completion of the messages to the controller 110.

An asynchronous message may include a flow-removed message, a port-status message, etc. A flow-removed message is used for the switch 120 to report deletion of a flow entry in the flow table to the switch 120. A port-status message is used for the switch 120 to report change of a port.

A symmetric message may include a hello message, an echo message, an error message, etc. A hello message is a message exchanged between the controller 110 and the switch 120 when the connection is established. An echo message comprises an echo request message and an echo response message, and may be transmitted by the switch 120 or the controller 110. The apparatus which receives the echo request message should transmit the echo response message. An error message is a message used by the switch 120 or the controller 110, and used for reporting an error to a counterpart of the connection.

Generally, the controller 110 wants to modify the flow table in the switch 120, it may transmit the above-described modify-state message to the switch 120. In this case, a type of modification is indicated in command classification information of the message. That is, the controller 110 may, one by one, add, modify, or delete a flow entry in the flow tables of the switch 120 by using the modify-state messages.

Meanwhile, the switch 120 does not immediately respond to the controller 110 for each of a plurality of modify-state messages instructing modifications on a plurality of flow entries. The switch transmits an error message to the controller 110 only when an error occurs.

Also, the controller 110 may use a barrier message in order to guarantee an operation order of instructions transmitted to the switch 120. For example, if the controller 110 transmits a barrier message to the switch 120 at a specific time, the switch 120 executes all instructions which have been received before it receives the barrier message, and the switch 120 transmits a result of the execution to the controller 110. In other words, in case that a series of instructions or operations must be performed sequentially, the controller 110 can control the order of the instructions or the operations, which are executed in the switch 120, by using the barrier message.

As described above, in the general method for modifying flow tables, the switch 120 does not immediately respond to the controller 110 for each of a plurality of modify-state messages. The switch transmits an error message to the controller 110 only when an error occurs. Therefore, even though an actual error occurs in the procedure for flow table modification, a case in which the switch cannot report an error message corresponding to the error due to a network failure or a communication failure of the switch 120 may occur. In this case, there may be a problem that the controller 110 regards the modification of the flow table as successful and continues the following controls.

Also, although the controller 110 uses a barrier message in order to guarantee a sequential instruction execution order of the switch 120, the controller 110 cannot exactly identify whether flow entries (or, states) related to each other in one or more flow tables are modified by using only the barrier message.

Also, in the above-described flow table modification method, since a modify-state message should be transmitted for each modification on the flow table, an 'atomicity' cannot be guaranteed. Here, the atomicity means that a plurality of modifications on the flow table (or, a plurality of modifications on states) should be reflected all together, or should not be reflected all together.

Hereinafter, methods for managing transactions according to example embodiments of the present invention, which can resolve the above-described problems, will be explained.

Figure 3:
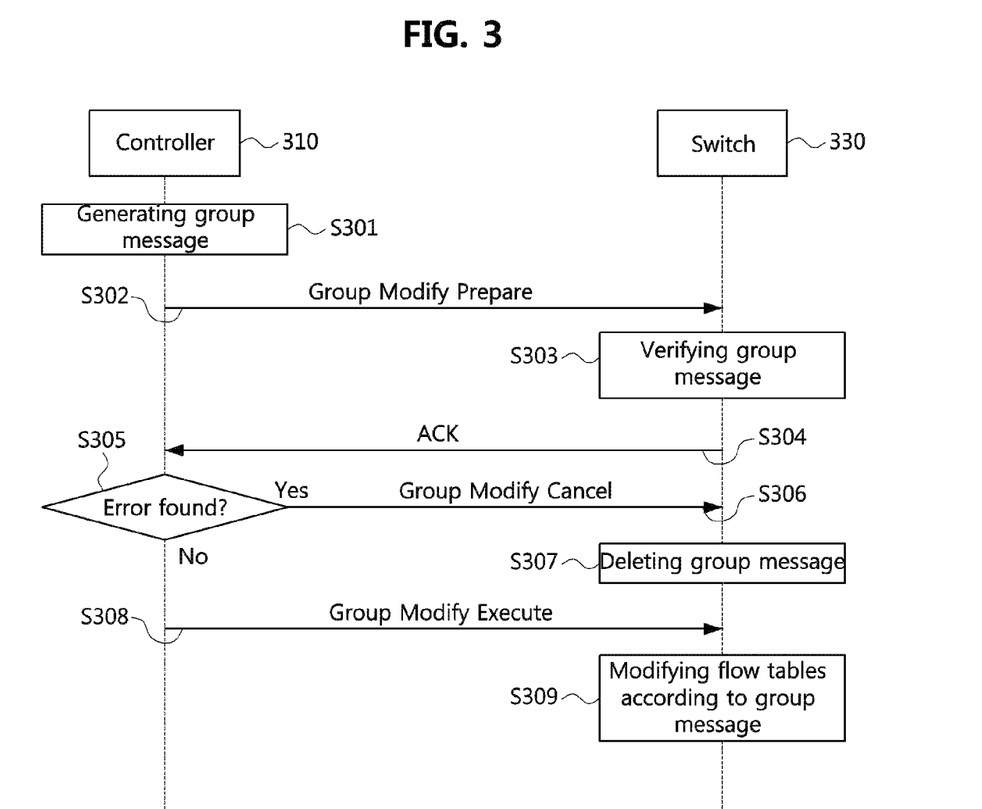
FIG. 3 is a sequence chart illustrating a method for managing transactions according to an example embodiment of the present invention.

FIG. 3 is a sequence chart illustrating a method for managing transactions according to an example embodiment of the present invention.

In FIG. 3, a procedure, in which a plurality of flow tables stored in a switch 330 are modified considering relevance between each other or operations which should be processed sequentially, is illustrated.

Referring to FIG. 3, the controller 310 may generate a group message for modifying flow entries (or, states) related to each other by considering relevance of flow entries (or, states) or flow entries which should be processed sequentially (S301). The flow entries or states are included in a plurality of flow tables stored in the switch 330. Here, the group message may include a plurality of command messages for simultaneously modifying flow entries related to each other among flow entries included in the flow tables stored in the switch 330. Also, the plurality of command messages included in the group message may be configured to have a same format for simultaneous modifications on a plurality of flow entries (or, states). The group message format and the command message format will be explained by referring to FIG. 7.

Then, the controller 310 may transmits a group message (a group message whose type is set to 'a group modify prepare message') including the command messages to the switch 330 (S302).

The switch 330 receives the group modify prepare message from the controller 310, and verifies the command messages included in the group modify prepare message (S303). Here, the switch 330 may verify syntaxes of the received group modify prepare message and each command messages included in the received group modify prepare message, or determine whether prerequisite conditions for executing the command messages are satisfied or not. Also, the switch 330 may optionally determine whether resources needed for executing the command messages are available or not.

Then, the switch 330 may transmit an acknowledgement (ACK) message (a group message whose type is set to 'a ACK message') including a verification result of the group modify prepare message to the controller 310 (S304). Here, the ACK message may include information on whether an error is found in the group modify prepare message (especially, in the command messages in the group modify prepare message). When the switch 330 finds at least one error in any message among the command messages included in the group modify prepare message, the switch 330 may make at least one error code corresponding to the at least one error be included in the ACK message, and transmit the ACK message to the controller 310.

Figure 8:
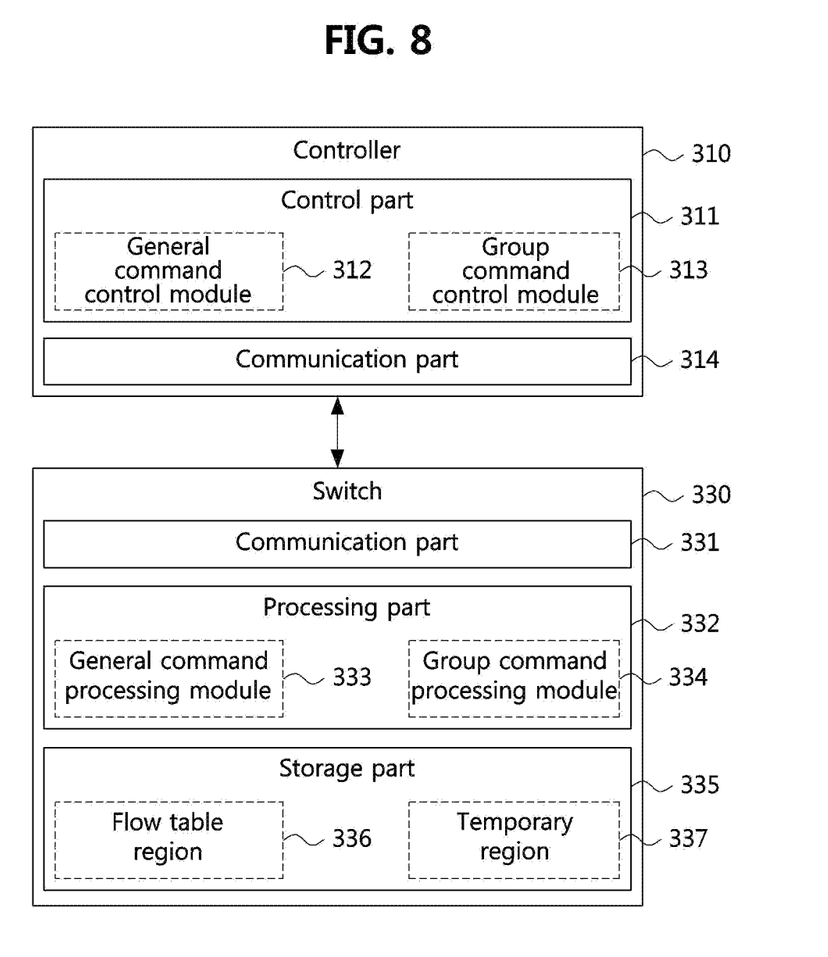
FIG. 8 is a block diagram illustrating a controller and a switch performing methods for managing transactions according to example embodiments of the present invention.

Also, if the switch 330 receives the group modify prepare message from the controller 310, it may store the received group modify prepare message in a temporary region (referring to FIG. 8). Here, when the switch 330 finds an error in the group modify prepare message after the verification, it may delete the group modify prepare message stored in the temporary region.

Then, the controller 310 waits for receiving the ACK message corresponding to the group modify prepare message from the switch 330. If the controller 310 receives the ACK message, it may check whether information indicating an error is included in the received ACK message (S305).

When the information (that is, error codes) indicating that the group modify prepare message has an error is included in the received ACK message, the controller 310 may transmit a group modify cancel message (a group message whose type is set to 'a group modify cancel message) instructing the switch 330 to cancel execution of the command messages included in the group modify prepare message (S306). When the switch 330 receives the group modify cancel message from the controller 310, it may not execute the received command messages, and may delete the group modify prepare message stored in the temporary storage (S307).

On the contrary, when the controller identifies that there is not an error in the group modify prepare message based on the ACK message, it may transmit a group modify execute message (a group message whose type is set to a 'group modify execute message') instructing the switch 330 to execute the command messages included in the group modify prepare message (S308). When the switch 330 receives the group modify execute message from the controller 310, it may modify the corresponding flow entries (or, states) of the flow table based on the command messages included in the group modify prepare message (S309). That is, the switch 330 may add, delete, or modify flow entries of the flow tables according to the command messages.

Figure 4:
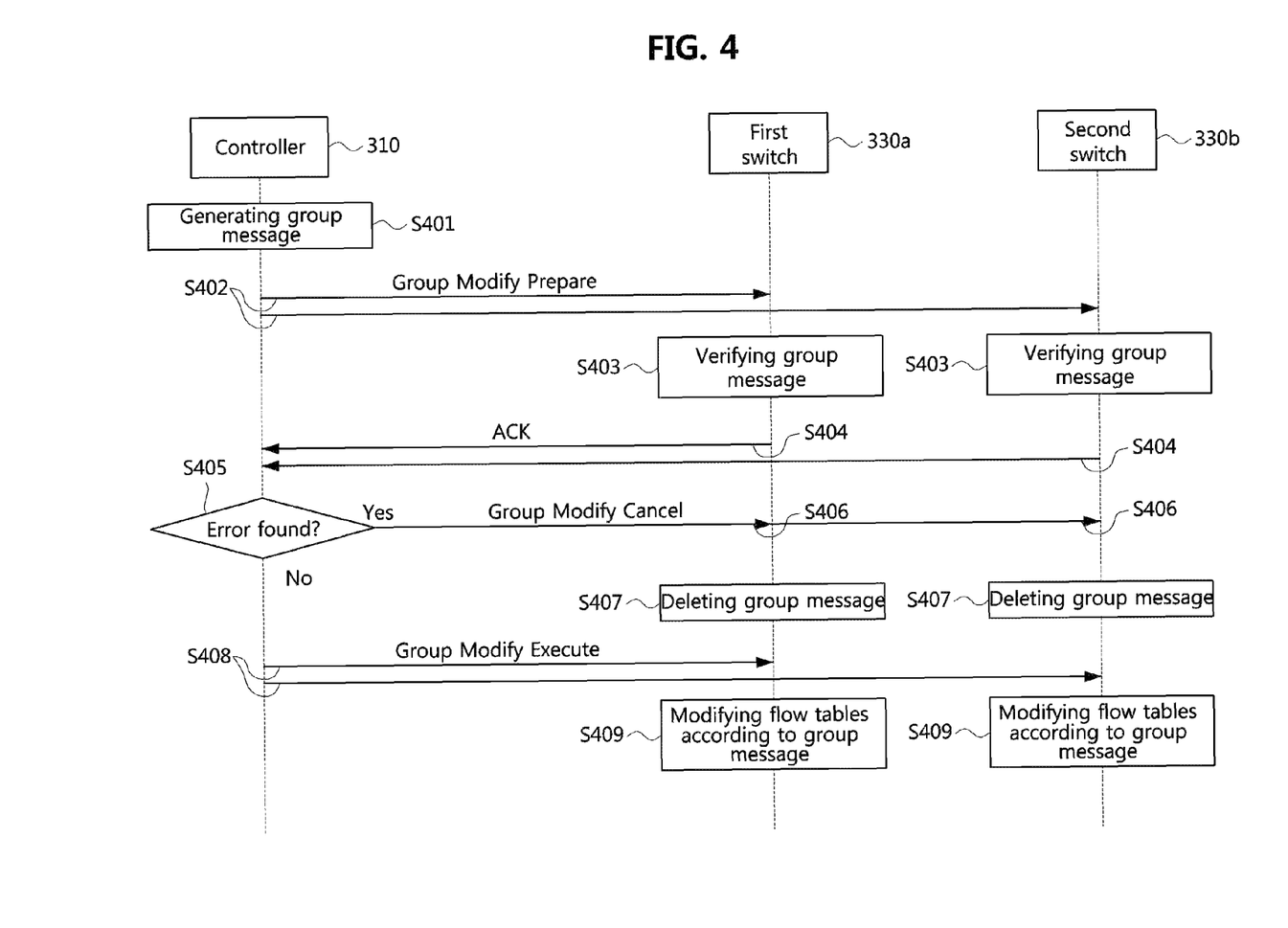
FIG. 4 is a sequence chart illustrating a method for managing transactions according to another example embodiment of the present invention.

FIG. 4 is a sequence chart illustrating a method for managing transactions according to another example embodiment of the present invention.

In FIG. 4, a procedure, in which a plurality of flow tables stored in a plurality of switches are modified considering relevance between each other, is illustrated. For convenience of explanation, only two switches 330a and 330b among a plurality of switches are illustrated. However, the method illustrated in FIG. 4 can be identically applied to cases where three or more switches exist.

Referring to FIG. 4, the controller 310 may generate a group message (a group message whose type is set to a 'group modify prepare message') for modifying flow entries (or, states) related to each other by considering relevance of flow entries (or, states) or flow entries which should be processed sequentially (S401). The flow entries or states are included in a plurality of flow tables stored in a first switch 330a and a second switch 330b. Here, the group modify prepare message may include a plurality of command messages for simultaneously modifying flow entries related to each other among flow entries included in the flow tables stored in the first switch 330a and the second switch 330b. Also, the plurality of command messages included in the group modify prepare message may be configured to have a same format for simultaneous modifications on a plurality of flow entries (or, states). The group message format and the command message format will be explained by referring to FIG. 7.

Then, the controller 310 may transmits a group modify prepare message including the command messages to the switches 330a and 330b (S402).

The switches 330a and 330b receive the group modify prepare message respectively from the controller 310, and verify the group modify prepare message and the command messages included in the group modify prepare message (S403). Here, the switches 330a and 330b may verify syntaxes of the received group modify prepare message and each command message included in the received group modify prepare message, or determine whether prerequisite conditions for executing the command messages are satisfied or not. Also, the switches 330a and 330b may optionally determine whether resources needed for executing the command messages are available or not.

Then, each of the switches 330a and 330b may transmit an acknowledgement (ACK) message (a group message whose type is set to 'an ACK message') including a verification result to the controller 310 (S404). Here, the ACK message may include information on whether an error is found in the group modify prepare message or the command messages included in the group modify prepare message. When each of the switches 330a and 330b finds at least one error in any command message among the command messages included in the group modify prepare message, each of the switches 330a and 330b may make at least one error code corresponding to the at least one error be included in the ACK message, and transmit the ACK message to the controller 310.

Also, if each of the switches 330a and 330b receive the group modify prepare message from the controller 310, each of the switches 330a and 330b may store the received group modify prepare message in a temporary region. Here, when each of the switches 330a and 330b finds an error in the group modify prepare message after the verification, it may delete the group modify prepare message stored in the temporary storage.

Then, the controller 310 waits for receiving the ACK message corresponding to the group modify prepare message from each of the switches 330a and 330b. If the controller 310 receives the ACK message, it may check whether information indicating an error is included in the received ACK message (S405).

When the information (that is, error codes) indicating that the group modify prepare message has an error is included in the ACK message received from at least one of the switches 330a and 330b, the controller 310 may transmit a group modify cancel message (a group message whose type is set to a 'group modify cancel message') instructing all the switches 330a and 330b to cancel execution of the command messages included in the group modify prepare message (S406). When the switches 330a and 330b receive the group modify cancel message from the controller 310, they may not execute the command messages included in the received group modify prepare message, and may delete the group modify prepare message stored in the temporary region (S407).

On the contrary, when the controller identifies that there is not any error in the group modify prepare message based on the ACK message received from the switches 330a and 330b, it may transmit a group modify execute message instructing all the switches 330a and 330b to execute the group message (S408). When the switches 330a and 330b receive the group modify execute message from the controller 310, they may modify the corresponding flow entries (or, states) of the flow table based on the command messages included in the group modify prepare message (S409). Here, the switches 330a and 330b may add, delete, or modify flow entries of the flow table according to instructions of the command messages.

As explained by referring to FIG. 4, in the present invention, a group message is defined based on relevance between flow tables stored in a plurality of switches (or, states which should be performed sequentially). When some of the plurality of switches which receive the group message find some error in the group message, execution of the group message is canceled in all the switches. Thus, consistency of operations in the switches can be guaranteed.

Figure 5:
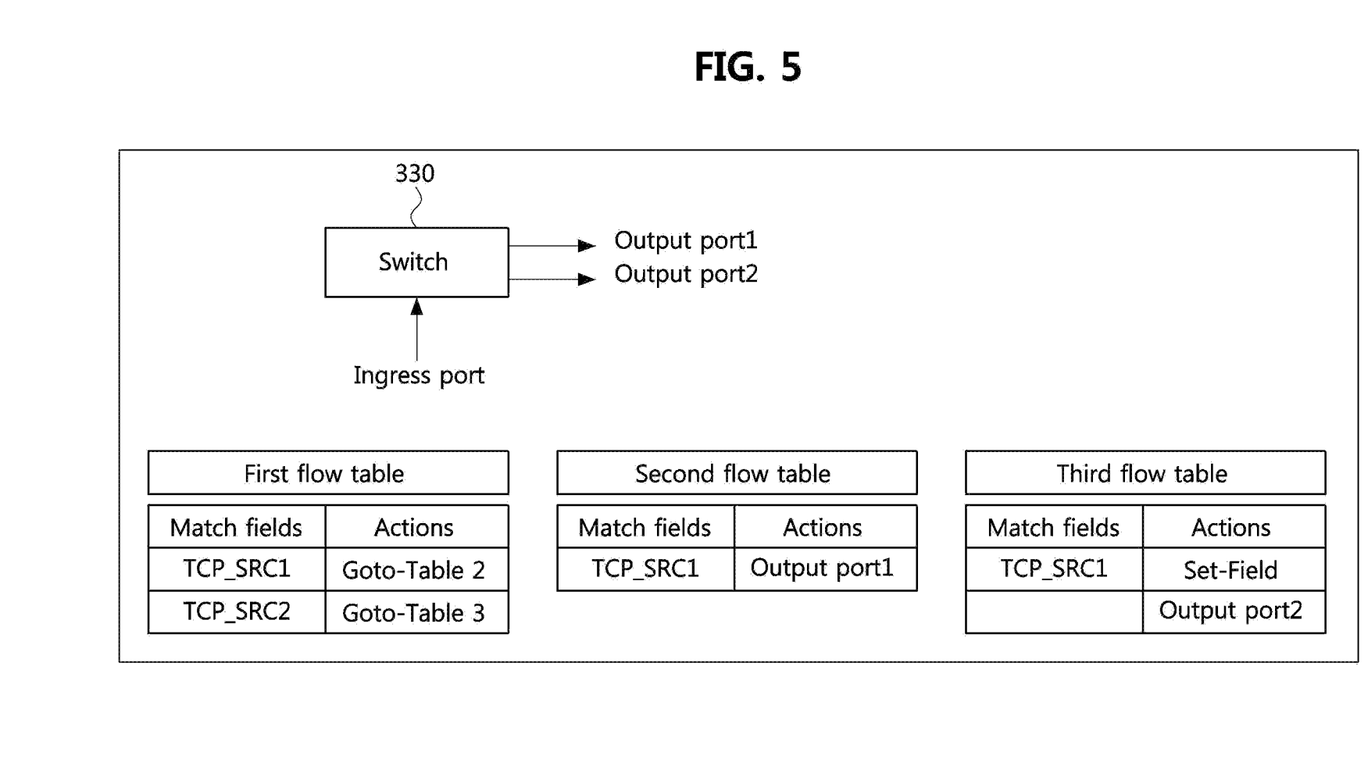
FIG. 5 is a conceptual diagram illustrating an example in which a method for managing transactions according to an example embodiment of the present invention is applied.

FIG. 5 is a conceptual diagram illustrating an example in which a method for managing transactions according to an example embodiment of the present invention is applied.

In FIG. 5, as an example, a procedure for modifying three flow tables having flow entries related to each other among a plurality of flow tables stored in a single switch 330 by using a group message is illustrated. An ingress port, a first output port, and a second output port, which are illustrated in FIG. 4, may be physical ports, or logical ports defined by the switch 330.

In the example illustrated in FIG. 5, two modifications on flow tables whose consistency should be maintained are assumed as follows.

A first modification on the flow tables is assumed as follows. A packet corresponding to a match field TCP_SRC1 of the first flow table among packets inputted to the ingress port of the switch 330 should be forwarded to the first output port. Here, an action for forwarding the packet to the first output port may be set to 'Output port1'. Also, when the packet should be processed in a second flow table, the action corresponding to the match field TCP_SRC1 of the first flow table may be set to 'Goto-Table2'.

Also, a second modification on the flow tables is assumed as follows. A packet corresponding to a match field TCP_SRC2 of the first flow table among packets inputted to the ingress port of the switch 330 should be forwarded to the second output port. Here, an action for forwarding the packet to the second output port may be set to 'Output port2'. Also, when the packet should be processed in a third flow table, the action corresponding to the match field TCP_SRC2 of the first flow table may be set to 'Goto-Table3'.

The above two modifications on the flow tables should be applied at the same time. If only one of the above two modifications is applied, there may be a problem in a packet flow control, or packets may be discarded.

For example, if only the second modification is applied although the first modification is not applied so that a packet corresponding to the match field TCP_SRC1 of the first flow table is forwarded to the second output port, both a packet corresponding to TCP_SRC1 and a packet corresponding to TCP_SRC2 are forwarded to the second output port. Thus, a collision between the packets can occur in the switch 330.

Therefore, in this example, the first modification and the second modification should be applied at the same time. For this, flow entries related to the above modifications, in the first to third flow tables, should be modified simultaneously for guaranteeing consistency.

In the present invention, as described in FIG. 3, the controller generates a group message for simultaneously modifying a plurality of flow entries which are related to each other, and transmit the generated group message to the switch 330. Then, the switch 330 executes a plurality of modifications instructed by the received group message so that consistency between modifications of flow tables within the switch 330 can be guaranteed.

Figure 6:
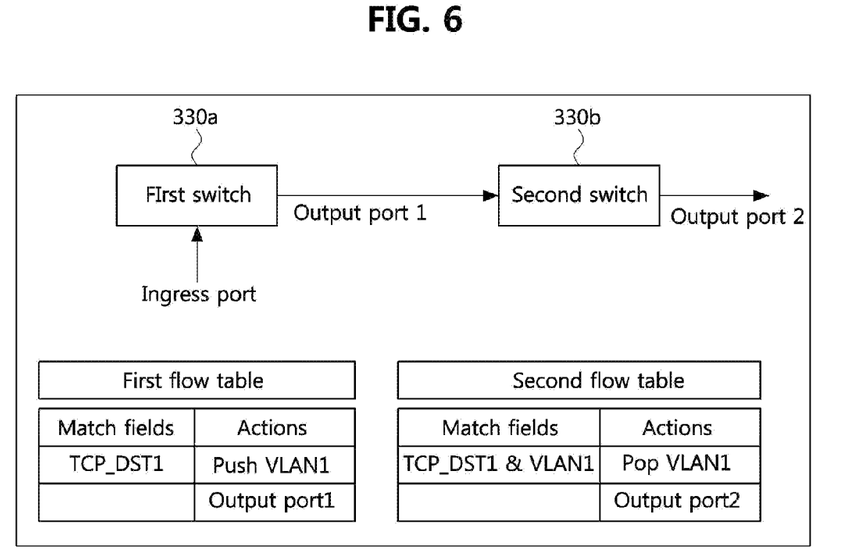
FIG. 6 is a conceptual diagram illustrating an example in which a method for managing transactions according to another example embodiment of the present invention is applied.

FIG. 6 is a conceptual diagram illustrating an example in which a method for managing transactions according to another example embodiment of the present invention is applied.

In FIG. 6, as an example, a procedure for modifying two flow tables having relevance to each other, stored respectively in two switches by using a group message is illustrated. In FIG. 6, for convenience of explanation, it is assumed that an output port of a first switch 330a is connected to an ingress port of a second switch 330b. Also, although only two switches are illustrated in FIG. 6, the present invention is not restricted to the case, and can be applied to a case where three or more switches exist. The ingress ports and the output ports of the switches 330a and 330b may be physical ports, or logical ports defined by the switches 330a and 330b.

In the example illustrated in FIG. 6, two modifications on flow tables whose consistency should be maintained are assumed as follows.

A first modification on the flow tables is assumed as follows. A packet corresponding to a match field TCP_DST1 of a first flow table among packets inputted to the ingress port of the first switch 330a should be tagged with 'VLAN1' and be forwarded to the first output port. Here, an action for tagging the packet with 'VLAN1' may be set to 'Push VLAN1', and an action for forwarding the packet to the first output port may be set to as 'Output port1'.

Also, a second modification on the flow tables is assumed as follows. A tag 'VLAN1' of a packet corresponding to a match field 'TCP_DST1 & VLAN1' of a second flow table among packets inputted to the ingress port of the second switch 330b should be detached, and the packet should be forwarded to the second output port. Here, an action for detaching the tag 'VLAN1' from may be set to as 'Pop VLAN1', and an action for forwarding the packet to the second output port may be set to 'Output port2'.

The above two modifications on the flow tables should be applied at the same time. If only one of the above two modifications is applied, there may be a problem in a packet flow control, or packets may be discarded.

For example, if only the first modification is applied and the second modification is not applied, a packet outputted from the first output port the switch 330a may not be outputted to the second output port of the second switch 330b.

Therefore, in this example, the first modification and the second modification should be applied at the same time. For this, flow entries related to the above modifications, in the flow tables of the switches 330a and 330b, should be modified simultaneously for guaranteeing consistency.

In the present invention, as described in FIG. 4, the controller generates a group message for simultaneously modifying a plurality of flow entries which are related to each other, and transmit the generated group message to a plurality of switches. Then, each of the plurality of switches executes a plurality of modifications instructed by the received group message so that consistency between modifications of flow tables belonging to different switches can be guaranteed.

Figure 7:
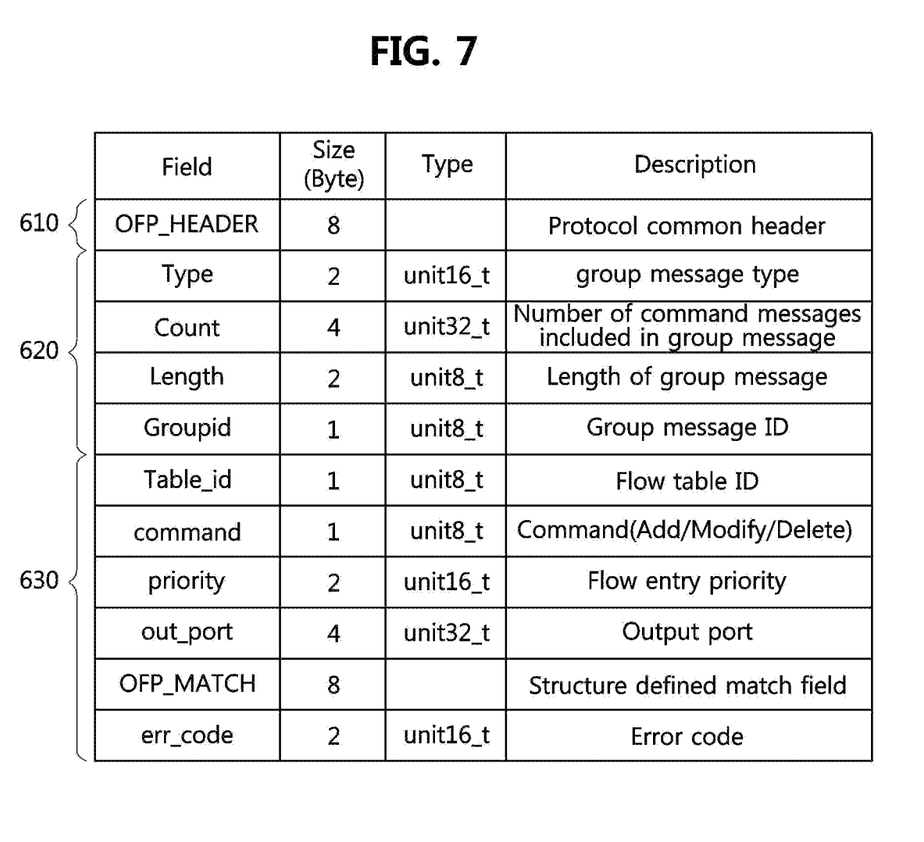
FIG. 7 illustrates a group message structure which is applied to example embodiments of the present invention.

FIG. 7 illustrates a group message structure which is applied to example embodiments of the present invention.

Referring to FIG. 7, a group message according to example embodiments of the present invention may comprise a header part 610 and a message part 630.

The header part 610 may be configured with a protocol header 610 and a group message header 620. For example, the protocol header may be configured as an OpenFlow protocol header, and may have a length of 8 bytes.

The group message header 620 may comprise a 'type' field, a 'count' field, a 'length' field, and a 'group ID' field.

The type field may have a length of 2 bytes, and indicate a type of the group message. As described above, the type of the group message may be classified into a group modify prepare message, an ACK message, a group modify cancel message, and a group modify execute message.

The count field may have a length of 4 bytes, and indicate the number of command messages included in the group message.

The length field may have a length of 1 byte, and indicate a unique identifier of the group message.

The message part 630 may comprise at least one command message. That is, multiple command messages having same format are included in the message part.

Each of the message part 630 may comprise a 'table_id' field, a 'command' field, a 'priority' field, and an 'out_port' field, an 'OFP_MATCH' field, and an 'err_code' field.

The table_id field may have a length of 1 byte, and indicate a unique identifier of a flow table which is a target of a command indicated by the command field.

The command file may have a length of 1 byte, and indicate a modification command to be applied to the flow table indicated by the table_id field. The command may include an 'Add' command instructing addition of flow entry to the flow table, a 'Modify' command instructing modification of flow entry, and a 'Delete' command instructing deletion of flow entry of the flow table.

The priority field may have a length of 2 bytes, and indicate a priority of flow entry.

The out_put field may have a length of 4 bytes, and indicate an output port.

The OFP_MACTCH field may have a length of 8 bytes, and may have a pointer indicating a structure defining a match field.

The err_code field may have a length of 2 bytes, and indicate a type of an error.

FIG. 8 is a block diagram illustrating a controller and a switch performing methods for managing transactions according to example embodiments of the present invention.

For convenience of explanation, a single controller 310 and a single switch 330 are illustrated in FIG. 8. However, in the actual SDN network, a plurality of switches can be connected to one or more controllers. Even for this case, the configurations of the controller 310 and the switch 330, illustrated in FIG. 8, can be used identically.

Referring to FIG. 8, the controller 310 may comprise a control part 311 and a communication part 314.

The control part 311 may include a general command control module 312 and a group command control module 313. Here, each of the general command control module and the group command control module can be configured as separate hardware (for example, processors), or configured as logical software modules which are executed by one or more processors.

The general command control module 312 is a module performing general management on the switch 330. That is, it can perform conventional flow table modifications except flow table modifications based on a group message, or perform controls for management of the switch 330.

The group command control module 113 is a module performing flow table modifications based on a group message. That is, the group command control module generates command messages for simultaneously modifying flow entries related to each other by considering relevance between flow tables within a single switch 330 or relevance between flow tables of multiple switches, and transmit a group modify prepare message including the generated command messages to the switch 330 or a plurality of switches through the communication part 314.

Also, the group command control module 313 receives an ACK message for the transmitted group message from the switch 330 or the plurality of switches through the communication part 314. If the received ACK message indicates an error, it may transmit a group modify cancel message indicating cancellation of the command messages to the corresponding switch or switches through the communication part 314.

On the contrary, the group command control module 313 may transmit a group modify execute message instruction of execution of the command messages to the corresponding switch or switches when the received ACK message indicates no error.

The communication part 314 may transmit various messages (for example, a group modify prepare message, a group modify cancel message, a group modify execute message, etc.) provided from the control part 311 to a specific switch or switches according to control of the control part 311. Also, it provides the control part 311 with group messages (for example, ACK messages) received from the switch or switches. Here, the communication part 314 may exchange messages with the switch or the switches based on at least one of predefined communication protocols.

The switch 330 may comprise a communication part 331, a processing part 332, and a storage part 335.

The communication part 33 transmits messages (for example, ACK messages) to the controller 310 via a network according to control of the processing part 332. Also, it receives various messages (for example, a group modify prepare message, a group modify cancel message, a group modify execute message, etc.) from the controller 310, and provides the processing part 332 with them. Here, the communication part 314 may exchange messages with the processing part 332 based on at least one of predefined communication protocols.

The processing part 332 may comprise a general command processing module 333 and a group command processing module 334. Here, the general command processing module 333 and the group command processing module 334 can be configured as separate hardware (for example, processors), or configured as logical software modules which are executed by one or more processors.

The general command processing module 333 is a module for processing general control commands received from the controller 310. That is, it can perform conventional flow table modifications except flow table modifications based on a group message, or general management of the switch 330.

As described above, the group command processing module 334 processes flow table modifications based on the group message received from the controller 310. After the group message is received from the controller 30, the group command processing module 334 stores the group message in a temporary region 337 of the storage part 335, and performs verification on syntaxes of the group message, prerequisite conditions and/or resource availability, etc. Here, the group command processing module 334 transmits an ACK message including a result of the verification to the controller 310 via the communication part 331. When the verification result is negative, the switch 330 may include at least one error code corresponding to at least one error found in the ACK message, and transmit the ACK message to the controller 310.

Also, when the group command processing module 334 receives a group modify cancel message from the controller 310, it may delete the group modify prepare message stored in the temporary region 337, and may not perform execution based on the group message. On the contrary, when the group command processing module 334 receives a group modify execute message from the controller 310, it may modify corresponding flow tables stored in the flow table region 336 according to the group modify prepare message stored in the temporary region 337.

The storage part 335 may comprise a flow table region 336 and a temporary region 337. Here, the flow table region 336 and the temporary region 337 may be configured as physically-separated independent storage devices, or may be configured as logically-separated regions in a single physical storage device.

The flow table region 336 is a region where a plurality of flow tables are stored, and the temporary region 337 is a region where a group modify prepare message received from the controller 310 is temporarily stored. The group modify prepare message stored in the temporary region 337 may be deleted based on a control of the group command processing module 334 when the verification on the stored group message fails, or a group modify cancel message is received from the controller 310, or all modifications indicated by the group message are completed after receiving the group modify execute message.

While the example embodiments of the present invention and their advantages have been described in detail, it should be understood that various changes, substitutions and alterations may be made herein without departing from the scope of the invention.

What is claimed is:

1. A method for managing transactions in a Software Defined Network (SDN), performed in a controller, the method comprising:
generating a group message for modifying flow entries of a plurality of flow tables related to each other in a switch;
transmitting the group message to the switch; and
receiving an acknowledgement (ACK) message indicating whether an error occurred in the group message from the switch,
wherein the group message includes a plurality of command messages for simultaneously modifying flow tables having relevance to each other among the plurality of flow tables in the switch.

2. The method of claim 1, wherein the plurality of command messages utilize common structure.

3. The method of claim 1, wherein the group message includes information on at least one of a type of the group message, a number of the plurality of command messages, a length of the group message, and an identifier of the group message.

4. The method of claim 1, further comprising: transmitting a message indicating execution of the group message or cancellation of the group message based on the ACK message to the switch.

5. The method of claim 4, wherein the ACK message includes an error code corresponding to the error in the group message.

6. The method of claim 4, wherein the transmitting the message indicating execution of the group message or cancellation of the group message includes transmitting the message indicating cancellation of the group message to the switch when an error occurred in at least one of a plurality of messages included in the group message.

7. A method for managing transactions in a Software Defined Network (SDN), performed in a controller, the method comprising:
generating a group message for modifying flow entries of a plurality of flow tables related to each other in a plurality of switches;
transmitting the group message to the plurality of switches; and
receiving an acknowledgement (ACK) message indicating whether an error occurred in the group message from the plurality of switches,
wherein the group message includes a plurality of command messages for simultaneously modifying flow tables having relevance to each other among the plurality of flow tables in the plurality of switches.

8. The method of claim 7, further comprising:
transmitting a message indicating execution of the group message or cancellation of the group message based on the ACK message to the plurality of switches.

9. The method of claim 8, wherein the transmitting the message indicating execution of the group message or cancellation of the group message includes transmitting the message indicating cancellation of the group message to the plurality of switches when received a message indicating occurrence of an error in the group message from at least one of the plurality of switches.

10. A method for managing transactions in a Software Defined Network (SDN), performed in a switch, the method comprising:
receiving a group message for modifying flow entries of flow tables related to each other in the switch from a controller;
verifying the group message; and
transmitting an acknowledgement (ACK) message including information on occurrence of an error in the group message to the controller,
wherein the group message includes a plurality of command messages for simultaneously modifying flow tables having relevance to each other among the plurality of flow tables in the plurality of switches.

11. The method of claim 10, further comprising storing the group message received from the controller in a temporary storage region of the switch.

12. The method of claim 10, wherein the verifying the group message includes determining validation of the group message in regard to syntaxes of the group message and/or prerequisite conditions of the group message.

13. The method of claim 10, wherein the verifying the group message includes determining resource availability for executing the group message.

14. The method of claim 10, wherein the ACK message includes an error code corresponding to an error occurred in the group message, if any.

15. The method of claim 11, further comprising:
receiving a message instructing execution of the group message from the controller; and
modifying the flow tables based on the group message stored in the temporary storage of the switch.

16. The method of claim 11, further comprising:
receiving a message instructing cancellation of the group message from the controller; and deleting the group message stored in the temporary storage region of the switch.

\* \* \* \* \*